(12) United States Patent
Itri

(10) Patent No.: US 6,909,781 B1
(45) Date of Patent: Jun. 21, 2005

(54) DSL LINE TESTER

(75) Inventor: Benedict A. Itri, Huntington Beach, CA (US)

(73) Assignee: GlobespanVirata, Inc., Red Bank, NJ (US)

( * ) Notice: Subject to any disclaimer, the term of this patent is extended or adjusted under 35 U.S.C. 154(b) by 745 days.

(21) Appl. No.: 09/819,325

(22) Filed: Mar. 28, 2001

Related U.S. Application Data

(60) Provisional application No. 60/193,623, filed on Mar. 31, 2000.

(51) Int. Cl.$^7$ .................................................. H04M 19/00
(52) U.S. Cl. ........................... 379/399.01; 379/399.02; 379/402
(58) Field of Search ........................ 379/399.01–405, 379/9.06, 27.03

(56) References Cited

U.S. PATENT DOCUMENTS 6,192,109 B1 * 2/2001 Amrany et al. ............. 370/494

* cited by examiner

*Primary Examiner*—Sinh Tran
*Assistant Examiner*—Daniel Swerdlow
(74) *Attorney, Agent, or Firm*—Thomas, Kayden, Horstemeyer, & Risley

(57) ABSTRACT

An analog front end system comprising a digital-to-analog converter, a line driver, a multiple-input device, and an analog-to-digital converter is presented. Furthermore, a method for DSL line testing comprising the steps of providing test stimuli to and receiving responses from a DSL line using an analog front end is presented. The presented system and method provides for the testing of a DSL line in an xDSL communications system deployment.

13 Claims, 7 Drawing Sheets

DSL LINE TESTER

CROSS-REFERENCE TO RELATED APPLICATION

The present application claims the benefit of U.S. provisional patent application, issued Ser. No. 60/193,623, and filed Mar. 31, 2000, which is hereby incorporated by reference in its entirety.

FIELD OF THE INVENTION

The present invention generally relates to digital subscriber line (DSL) communications. More specifically, the invention relates to DSL line testing.

BACKGROUND OF THE INVENTION

In recent years, telephone communication systems have expanded from traditional plain old telephone system (POTS) communications to include high-speed data communications as well. As is known, POTS communications include the transmission of voice information, control signals, public switched telephone network (PSTN) information, as well as, information from ancillary equipment in analog form (i.e., computer modems and facsimile machines) that is transmitted in the POTS bandwidth.

Prompted largely by the desire of large businesses to reliably transfer information over a broadband network, telecommunications service providers have implemented digital subscriber line (DSL) to provide a plethora of interactive multi-media digital signals over the same existing POTS twisted-pair lines. Since the introduction of DSL, several major types of DSL service have been developed and deployed. These major types include ISDN DSL (IDSL), Symmetric DSL (SDSL), Asymmetric DSL (ADSL), and High bit rate DSL (HDSL). With the advent of these major types, represented by the aforementioned acronyms, DSL is also referred to as xDSL.

In order to maintain the reliable operation of DSL communications service, the capability to test and evaluate the DSL line, i.e. the twisted-pair lines (which are typically composed of copper), is desired. In some xDSL deployments, a number of Incumbent Local Exchange Carriers (ILEC's) and Competitive Local Exchange Carriers (CLEC's) have been installing additional external devices known as metallic (e.g., copper) "cross-connects" in conjunction with other additional devices known as DSL Access Multiplexers (DSLAM's) to provide metallic access to the DSL line for testing purposes. Testing of the DSL lines for fault detection or evaluation of the bit-rate capacity of a particular loop can be accomplished using cross-connects and DSLAM's to by-pass the DSL line to an integrated test head. Also, functions for trouble-shooting and installation activities on a DSL line are obtained using cross-connects and DSLAM's. But, metallic cross-connects are external devices that are installed in addition to the required devices for normal operation of a communications system. DSLAM's are also additional devices that are typically integrated with the normal system devices, but may also be installed externally. Because of the additional devices and installation requirements, the use of cross-connects and DSLAM's for testing purposes is an undesirably expensive practice.

HDSL/T1 based communications systems are one popular example of the application of xDSL deployments. In HDSL deployments, such as HDSL/T1 based communications systems, current test systems only offer the capability for in-band (i.e. within the system unit) testing. HDSL/T1 based communications systems have evolved in popularity as a result of the development of the HDSL market as a replacement for conventional T1 systems, which consist of dedicated high-speed digital communications circuits. Specifically, HDSL plugs (where a plug contains some number of connection ports) are being integrated into existing T1 systems as an alternative to traditional T1 plugs. Advantages of this practice include the reduction of overhead equipment, such as repeaters (which amplify or regenerate signals to extend transmission distances), improved performance with respect to crosstalk (i.e. interference from adjacent lines), and higher quality bit-error performance. But, since current testing systems for HDSL/T1 based systems only offer in-band testing capability, the capability to test the physical DSL line using such test systems is lacking. Furthermore, this lack of capability to test the DSL line is a deficiency found in current test systems for other types of xDSL communications systems deployments as well, and costly work-arounds have been currently employed, as discussed above.

Expanding on HDSL/T1 based communications systems as an example of current testing practices in xDSL deployments, FIG. 1 shows a simplified block diagram of a typical HDSL/T1 based communications system 100 and related typical testing components 106, 112, as is known in the prior art. In this regard, the communications system includes a central office (CO) line unit 102 and a remote unit 104. The CO unit 102 and the remote unit 104 are networked to each other by one or more DSL lines 110 and to other communications systems (not shown) by T1 circuits 116. The CO unit 102 includes, in addition to the testing components 106, 112, HDSL/T1 interface circuitry 114 and a T1 line interface unit (LIU) 118. Although not shown, the remote unit 104 includes similar components to the CO unit 102, such as interface circuitry 114 and T1 LIU 118.

The testing components 106, 112, only offer the capability for in-band testing of the communications system 100. Essentially, various loop-backs 106 (where a loop-back is a device that redirects a transmitted signal back to the transmitter for testing purposes), are employed within the communications system 100 for testing purposes, as shown in FIG. 1. Testing is accomplished by detection of loop-back control signals transmitted in-band by a loop-back detector, such as the loop-back detector 112. The loop-backs 106 and the loop-back detector 112 enable the locating of a problem in the system 100 at either the CO unit 102 or the remote unit 104, but problems at the remote unit 104 can only be detected when the interfacing DSL line 110 is functioning properly (i.e., acceptable bit-rate capacity, no faults, etc.). Furthermore, the typical testing components 106, 112 do not offer the capability to test the DSL line 110 for faults, proper performance, or other testing criteria.

Therefore, there is a need for a testing system and method capable of testing a DSL line in an xDSL communications system deployment. Furthermore, there is a need for a system and method capable of testing a DSL line in an xDSL deployment that does not require additional, external test-support devices and that is, therefore, cost-effective over the prior art.

SUMMARY OF THE INVENTION

Certain objects, advantages, and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve various objects and advantages, the present invention is directed to a novel system and method of a DSL line tester. Broadly, the present invention provides test stimuli to a DSL line using an analog front end (AFE).

In accordance with a preferred embodiment of the present invention, an AFE system is provided that includes a digital-to-analog converter (D/A) and an analog-to-digital converter (A/D), a line driver, and a multiple-input device. In accordance with another preferred embodiment of the present invention, a method for DSL line testing is provided that includes the steps of transmitting test stimuli to and receiving responses from a DSL line using an AFE.

One advantage of a preferred embodiment of the present invention is that it allows the testing of a DSL line, in an xDSL communications system deployment, for faults, proper performance, or other testing criteria. Another advantage of a preferred embodiment of the present invention is that it allows the testing of a DSL line, in an xDSL communications system deployment, without the requirement of additional, external test-support devices. Yet another advantage of a preferred embodiment of the present invention is that it allows the testing of a DSL line, in an xDSL communications system deployment, that is cost-effective over the prior art.

Other objects, features, and advantages of the present invention will become apparent to one skilled in the art upon examination of the following drawings and detailed description. It is intended that all such additional objects, features, and advantages be included herein within the scope of the present invention, as defined by the claims.

BRIEF DESCRIPTION OF THE DRAWINGS

The present invention will be more fully understood from the detailed description given below and from the accompanying drawings of a preferred embodiment of the invention, which however, should not be taken to limit the invention to the specific embodiments enumerated, but are for explanation and for better understanding only. Furthermore, the drawings are not necessarily to scale, emphasis instead being placed upon clearly illustrating the principles of the invention. Finally, like reference numerals in the figures designate corresponding parts throughout the several drawings.

DETAILED DESCRIPTION OF THE PREFERRED EMBODIMENTS

Figure 1:
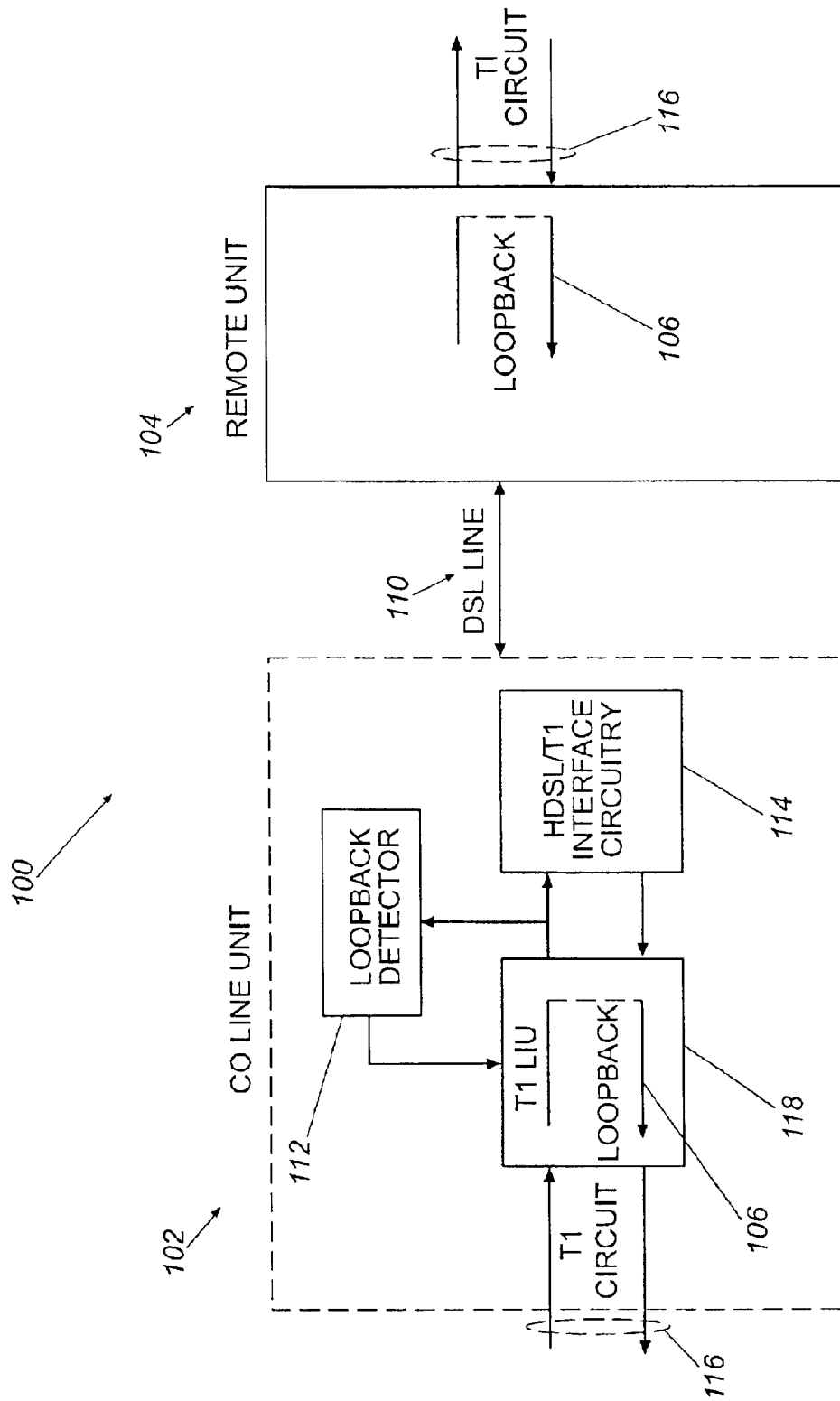
FIG. 1 is a block diagram of a typical testing scheme employed in an HDSL/T1 based communications system, as is known in the prior art.

Having summarized the invention above, reference is now made in detail to the description of the invention as illustrated in the drawings. While the invention will be described in connection with these drawings, there is no intent to limit it to the embodiment or embodiments disclosed therein. On the contrary, the intent is to cover all alternatives, modifications, and equivalents included within the spirit and scope of the invention as defined by the appended claims. Indeed, the present invention is believed to be applicable to a variety of systems, devices, and technologies.

Figure 2:
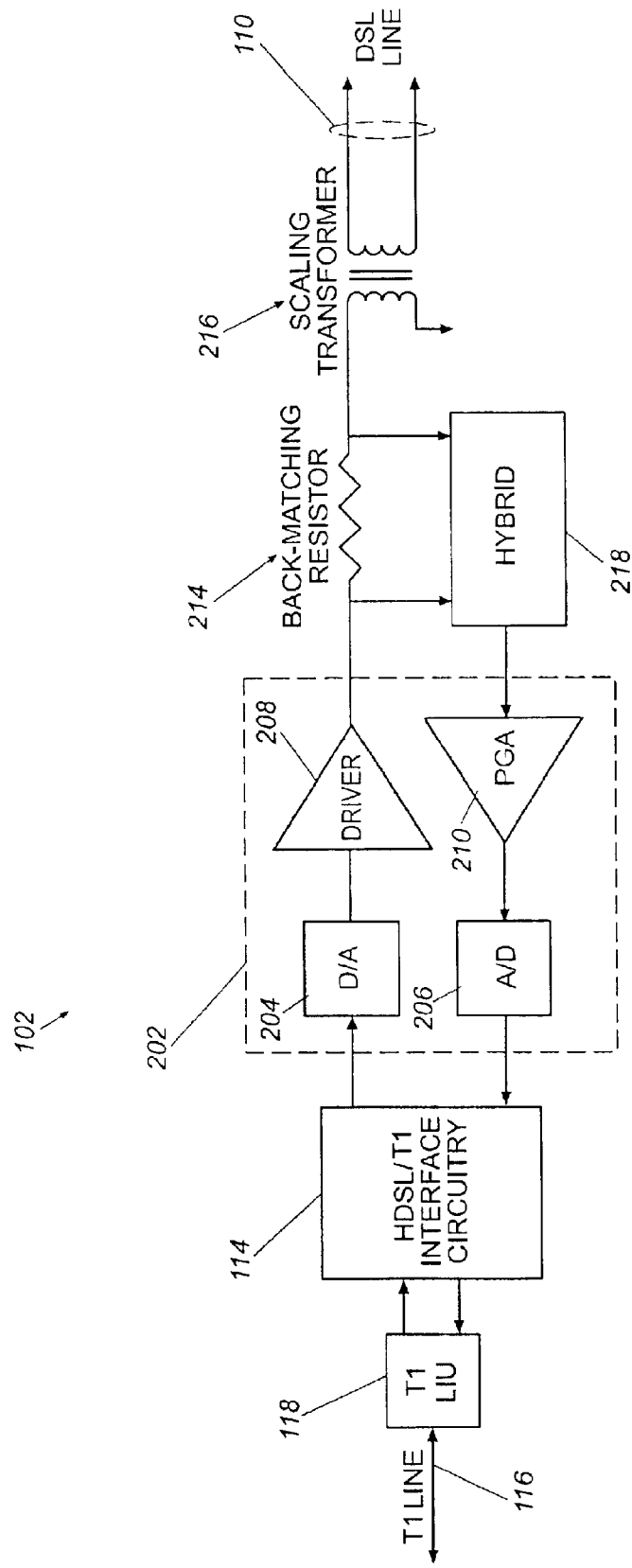
FIG. 2 is a block diagram of a typical analog front end (AFE) with related HDSL/T1 interface components, as is known in the prior art.

Turning now to the drawings, wherein like referenced numerals designate corresponding parts throughout the drawings, FIG. 2 shows a block diagram of a typical analog front end (AFE) 202 with related HDSL/T1 interface components 114, 118, 214, 216, 218, as is known in the prior art. The following description of the present invention is made in the context of application to HDSL/T1 based communications systems in order to facilitate the description of the present invention, but it should be understood that the present invention can be applied to all communications systems in general that incorporate an xDSL interface and all such applications are included within the scope of the present invention. In this regard, the AFE 202 includes a digital-to-analog converter (D/A) 204 and an analog-to-digital converter (AID) 206, as is known in the art. Further, as is known in the art, the AFE 202 includes a line drive 208 and a programmable gain amplifier (PGA) 208. Also included in the AFE 202 is processing circuitry (not shown) that is responsive to AFE operation commands and is known in the art.

Any interface of an xDSL line to a line of a different communications system, for example T1, requires an AFE at the interface. For example, as shown in FIG. 2, the AFE 202 provides an interface between the DSL line 110 and the HDSL/T1 interface circuitry 114. In one embodiment of the present invention, the AFE 202 is utilized to provide test stimuli for testing the DSL line 110. Specifically, in a preferred embodiment of the present invention, the D/A 204 and the A/D 206 are utilized to generate and provide test stimuli for testing the DSL line 110.

Figure 3:
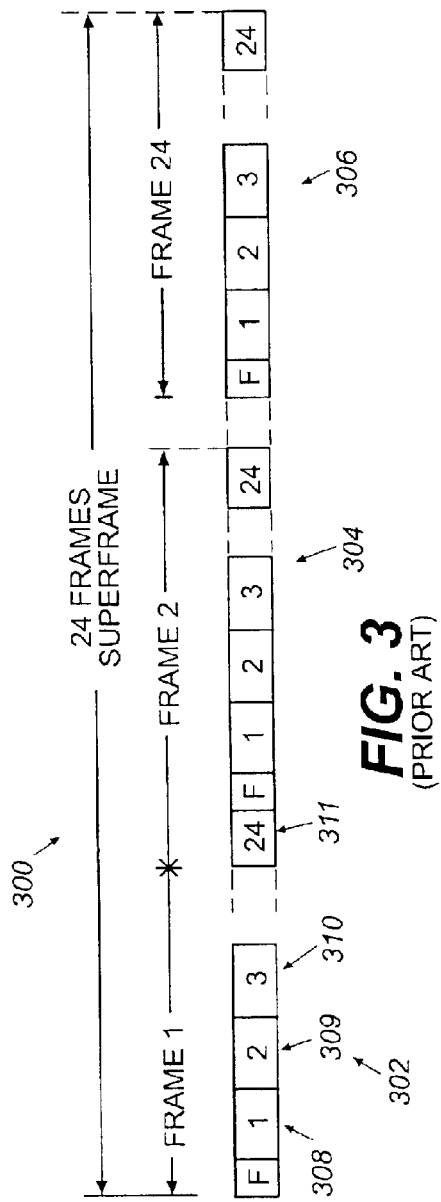
FIG. 3 shows a diagrammatic representation of T1 Extended SuperFrame (ESF) format, as is known in the prior art.

In another preferred embodiment of the present invention, testing information is carried on the in-band T1 signal, in a system such as that depicted in FIG. 2, to allow for capture and off-line processing of the testing information. Using the in-band T1 signal, testing samples from the D/A 204 and A/D 206 are transmitted over the T1 line 116. The CO line unit 102 interprets the information being carried over the T1 line 116 as analog data in response to a specific in-band command. Furthermore, the capability to provide fault isolation to the DSL line 110 is incorporated within the signaling format. To further facilitate the description of the present invention, FIG. 3 is presented which shows a diagrammatic representation of a T1 Extended SuperFrame (ESF) format 300, as is known in the prior art. T1 ESF 300 is an enhanced T1 communications format. The format uses 24 frames grouped together as a T1 extended superframe (ESF) 300, where each frame (e.g., 302, 304, 306) contains 24 8-bit channels (e.g., 308–311) that repeat at an 8 kHz frame-rate.

Figure 4:
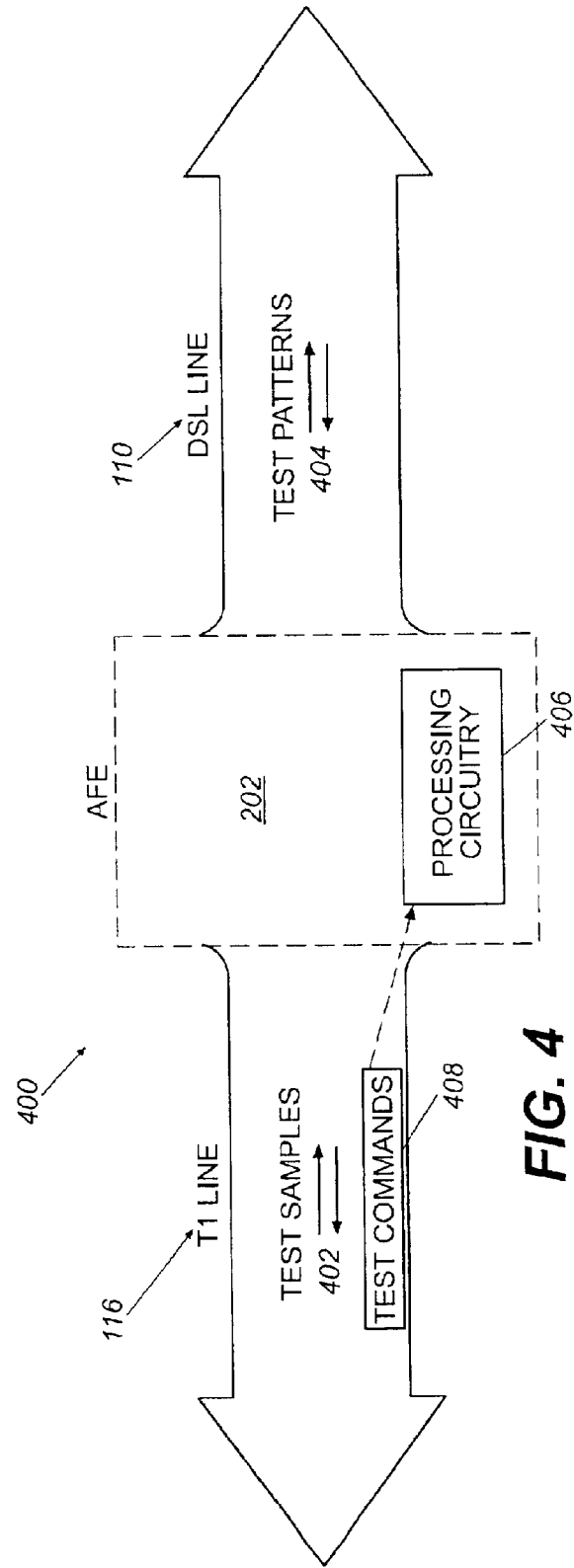
FIG. 4 is a block diagram representation of a testing system, in accordance with an embodiment of the present invention.

A block diagram representation of a testing system 400, in accordance with an embodiment of the present invention, is shown in FIG. 4. The testing system 400 implements an AFE 202 to interpret T1 test samples 402 as 8-bit D/A and A/D digitized values, using T1 ESF (e.g., 300 of FIG. 3) in an HDSL/T1 based system (e.g., 100 of FIG. 1), in response to test commands 408 that are received by the processing circuitry 406. The processing circuitry 406 is responsive to test commands 408, in addition to being responsive to common AFE commands (not depicted). In this embodiment, the test commands 408, which may be sent to the AFE along with the test samples 402 over a T1 line 116 using a computer or other test input device (not shown), control the interpretation of the test samples 402 as 8-bit digitized values and the generation of test patterns 404 based on these digitized values. The digitized values interpreted from the test samples 402 by the AFE 202 in response to test commands 408 allow for the generation of test patterns 404 that have 576 samples which repeat for each T1 ESF 300 (FIG. 3) with a test frequency limited to 192 kHz. As shown in FIG. 4, the test samples 402 are carried on a T1 line 116 and the test patterns 404 are carried on a DSL line 110.

Figure 5:
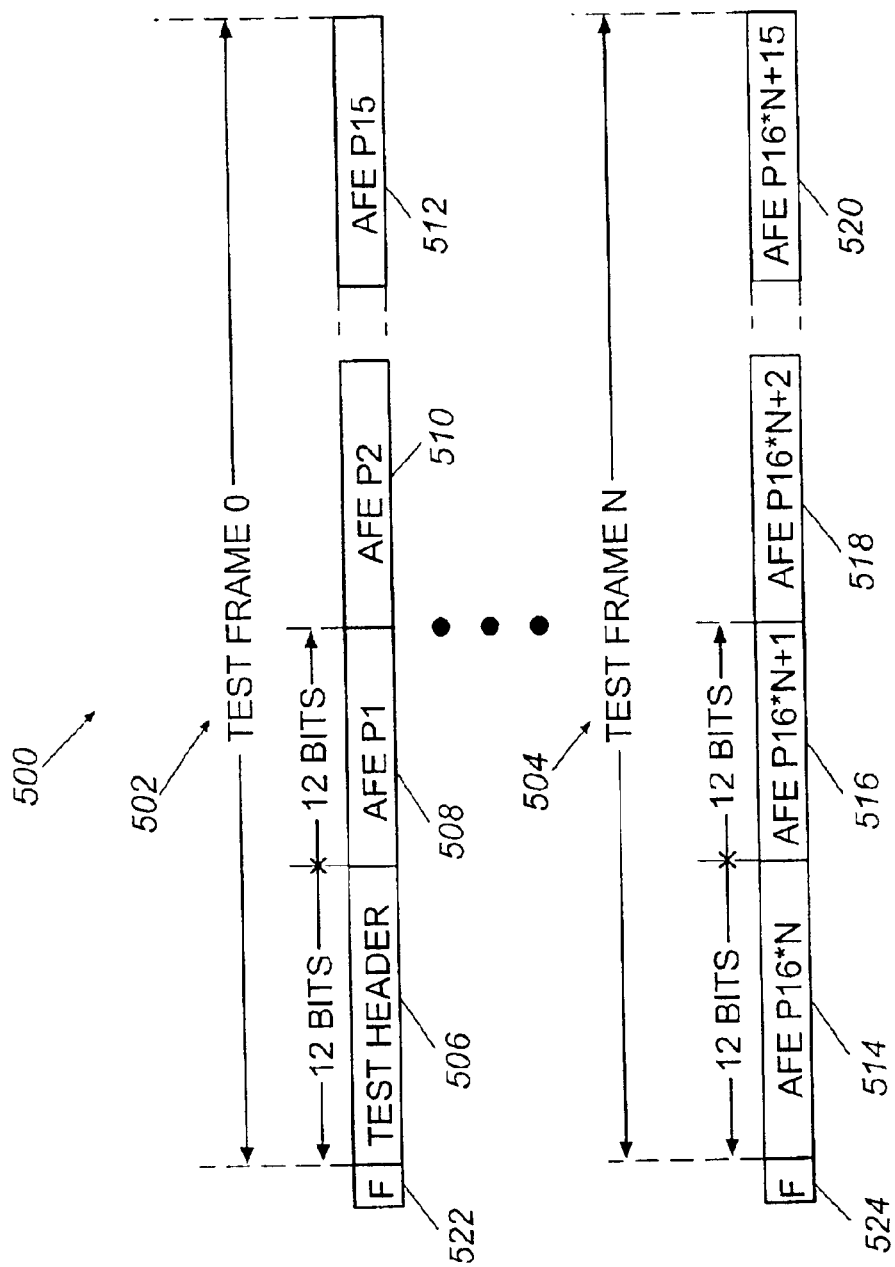
FIG. 5 shows a diagrammatic representation of a testing format, in accordance with a preferred embodiment of the present invention.

A diagrammatic representation of a testing format, in accordance with a preferred embodiment of the present invention, is shown in FIG. 5. The testing format comprises a test superframe 500 comprising 24 test frames (e.g., 502, 504) per T1 ESF 300 (FIG. 3). The entire test superframe 500 is formatted to comprise 384 12-bit samples, and the first 12-bit word after the test superframe marker 522 represents a test header 506, which may be a test control header (during transmission from the test device to the AFE) or a test status header (during transmission from the AFE to the test device). The 12-bit sample format is an example of one format that provides high resolution to facilitate the testing of DSL line performance, but formats of other bit-lengths can be implemented and are included within the scope of the present invention.

Figure 6:
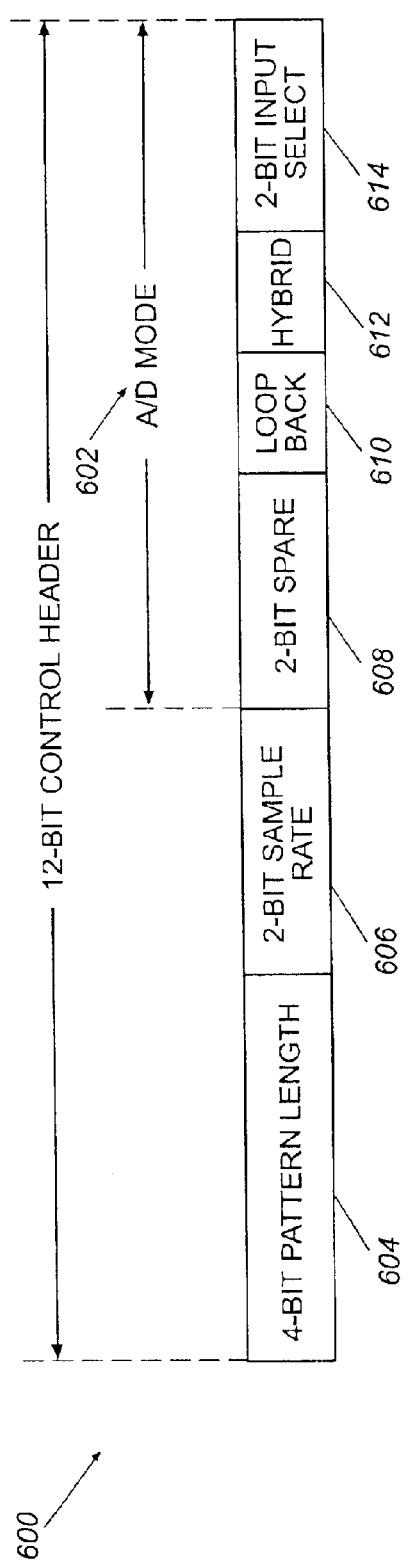
FIG. 6 shows a diagrammatic representation of a 12-bit test control header format, in accordance with a preferred embodiment of the present invention.

A diagrammatic representation of a 12-bit test control header format 600, in accordance with a preferred embodiment of the present invention, is shown in FIG. 6. The 12-bit control header 600 is included in the T1 signal that is received by the AFE (e.g., 202 of FIG. 2) from a testing device (not shown) during testing and occupies the position of the test header 506 (FIG. 5) when the signal is transmitted. Thus, although the control header 600 is described as 12-bits in length for this particular application, it may be implemented in other bit-lengths and such implementations are included within the scope of the present invention. The information in the control header 600 provides at least the following capabilities: 1) generation of test patterns in excess of 384 samples; 2) generation of word sampling rates that support the analysis of subject test frequencies; 3) self-testing analysis of an AFE (e.g., 202 of FIG. 2); 4) providing of additional A/D test inputs for other testing functions; 5) disabling of a hybrid (e.g., 218 of FIG. 2) for various testing purposes.

The control header 600 is defined by several fields, as shown in FIG. 6. The summation of the bit-lengths of these fields is equivalent to the bit-length of the control header 600, which in the description for this particular application is 12-bits. Although specific bit-lengths are described for these fields, as follows, it is understood that these specific bit-lengths are only presented to facilitate the description of the present invention. Other bit-lengths can be implemented and such implementations are included within the scope of the present invention. The pattern length field 604 (a 4-bit field in this description) allows for the generation of up to 16 unique superframes comprised of 16 pattern fields and 384 unique patterns. To support the pattern length scheme, a buffer (not shown) of sufficient size to the store the D/A and A/D samples may be provided.

The sample rate field 606 (a 2-bit field in this description) allows the selection of one of four predefined sampling rates that the D/A and A/D (e.g., 204, 206 of FIG. 2) operate at for the particular test pattern that is generated. The loop-back field 610 (a 1-bit field in this description) is used to loop-back the D/A 204 to the AID 206 for testing of the AFE 202 (e.g., FIG. 2). The hybrid field 612 (a 1-bit field in this description) is used to enable or disable the internal hybrid 216 of the AFE 202 (e.g., FIG. 2) to facilitate various fault isolation tests. The input select field 614 (a 2-bit field in this description) is used to select from a plurality of test inputs to the A/D. Between the sample rate field 606 and the loop-back field 610, there is a spare field 608 (a 2-bit field in this description), as shown in FIG. 6. This field may be used to increase the bit-length of another field, add additional functions to the control header 600, or provide other fields for the control header 600. Furthermore, the A/D mode control sub-header 602, as shown in FIG. 6, comprises the fields which are used to control the setting modes of the AFE 202 (e.g., FIG. 2) during testing. In this particular description, these fields are the spare field 608, the loop-back field 610, the hybrid field 612, and the input select field 614.

Figure 7:
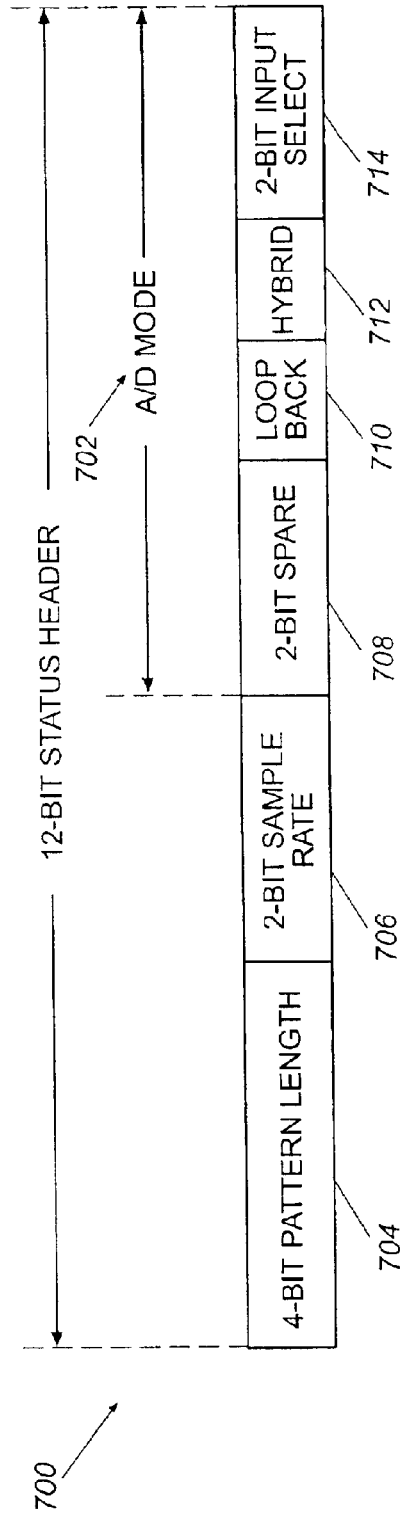
FIG. 7 shows a diagrammatic representation of a 12-bit status header format, in accordance with a preferred embodiment of the present invention.

A diagrammatic representation of a 12-bit status header format 700, in accordance with a preferred embodiment of the present invention, is shown in FIG. 7. The status header 700 is supplied by the CO line unit (e.g., 102 of FIG. 1). The 12-bit status header 700 is included in the T1 signal that is transmitted from the AFE (e.g., 202 of FIG. 2) to a testing device (not shown) during testing and occupies the position of the test header 506 (FIG. 5) when the signal is transmitted. Thus, although the status header 700 is described as 12-bits in length for this particular application, it may be implemented in other bit-lengths and such implementations are included within the scope of the present invention. The information in the status header 700 provides at least the following capabilities: 1) identification of the A/D samples for each input test pattern; 2) providing of status in response to a specific control header.

The status header 700 is defined by several fields, as shown in FIG. 7. These fields correspond to the fields of the test control header 600 (FIG. 6). The summation of the bit-lengths of these fields is equivalent to the bit-length of the status header 700, which in the description for this particular application is 12-bits. Although specific bit-lengths are described for these fields, as follows, it is understood that these specific bit-lengths are only presented to facilitate the description of the present invention. Other bit-lengths can be implemented and such implementations are included within the scope of the present invention. The pattern length field 704 (a 4-bit field in this description) allows for the identification of up to 16 unique superframes comprised of 16 pattern fields and 384 unique patterns. To support the pattern length scheme, a buffer (not shown) of sufficient size to the store the D/A and A/D samples may be provided. The sample rate field 706 (a 2-bit field in this description) provides the selection status of one of four predefined sampling rates that the D/A and A/D operate at for the particular test pattern that is generated. The loopback field 710 (a 1-bit field in this description) is used to provide the status of the loop-back of the D/A 204 to the A/D 206 for testing of the AFE 202 (e.g., FIG. 2). The hybrid field 712 (a 1-bit field in this description) is used to provide a status of the internal hybrid 216 (which is an interface component between the AFE 202 and the DSL line 110) of the AFE 202 (e.g., FIG. 2). The input select field 714 (a 2-bit field in this description) provides the status of the test input selection(s) to the A/D (e.g., 206 of FIG. 2). Between the sample rate field 706 and the loop-back field 710, there is a spare field 708 (a 2-bit field in this description), as shown in FIG. 7. This field can be used to provide status or pattern identification in correspondence to the use of the spare field 608 of the control header 600 (FIG. 6). Furthermore, the AID mode status sub-header 702, as shown in FIG. 7, comprises the fields which are used to provide the status of the setting modes of the AFE 202 (e.g., FIG. 2) during testing. In this particular description, these fields are the spare field 708, the loop-back field 710, the hybrid field 712, and the input select field 714.

Figure 8:
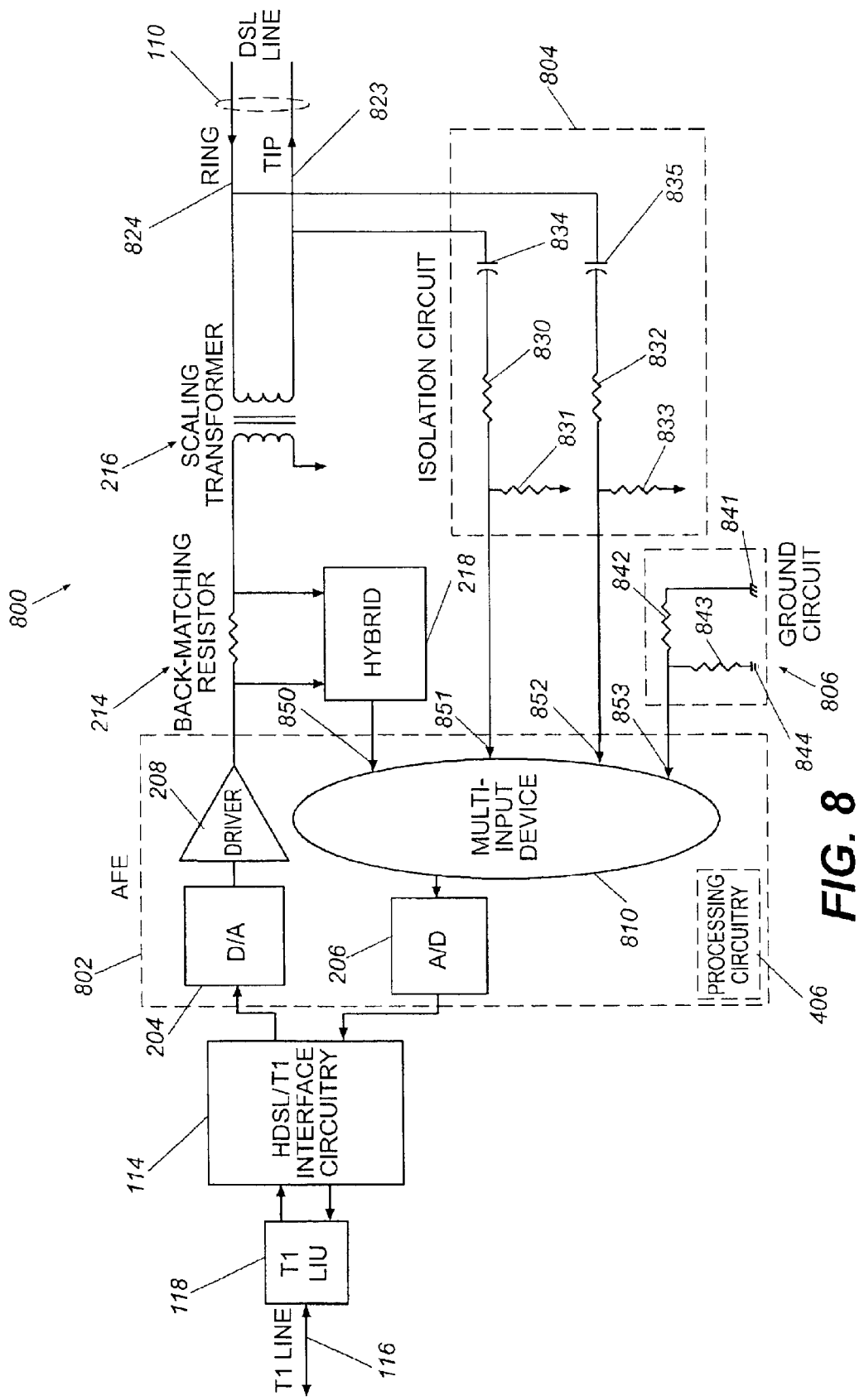
FIG. 8 is a block diagram of an analog front end (AFE) system with related DSL line interface components, in accordance with a preferred embodiment of the present invention.

A block diagram of an analog front end (AFE) system 802 and related DSL line interface components 800, in accordance with a preferred embodiment of the present invention, is shown in FIG. 8. The AFE 802 comprises a D/A 204, an AID 206, and a line driver 208, similar to the conventional AFE 202 (FIG. 2), but the AFE 802 also comprises a multiple-input device 810 and processing circuitry 406 that is responsive to test commands (not depicted). The multiple-input device 810 may have two or more inputs and one or more outputs, for example four inputs and one output, as shown in FIG. 8. The multiple-input device 810 multiplexes the inputs to the output(s), thus it may be implemented by, for example, a multiplexer. In this particular description, the multiple-input device 810 multiplexes a plurality of inputs (850–853) from the DSL line interface components 800 to the A/D 206 for testing purposes. As described above, the plurality of inputs are selectable using the input select field 614 of the control header 600 (FIG. 6). The hybrid input 850 carries a signal from the hybrid 218, which interfaces the D/A 204 and A/D 206 to the DSL line 110 and eliminates the transmit signal from the received signal in normal operation. The tip input 851 carries a signal from the tip conductor ("tip") 823 of the DSL line 110 for various testing purposes, such as measuring the common-mode voltage with respect to a ground reference. The ring input 852 carries a signal from the ring conductor ("ring") 824 of the DSL line 110 for various testing purposes, such as measuring the common-mode voltage with respect to a ground reference. Finally, the ground input 853 supplies a ground signal to the A/D for various testing purposes, such as providing a ground reference voltage for the common-mode voltage measurements of the tip 823 and ring 824 of the DSL line 110.

Continuing with reference to FIG. 8, the signals carried by tip input 851 and ring input 852 pass through an isolation circuit 804. The isolation circuit 804 allows monitoring or testing of the tip 823 and ring 824 of the DSL line 110 while maintaining DC isolation from the DSL line 110. As shown in FIG. 8, the isolation circuit 804 may comprise, for example, a plurality of resistance and capacitance elements (830–835) such as but not limited to conventional electronics resistors and capacitors. These isolation resistance elements (830–833) may be sized to meet applicable regulatory requirements for DC isolation of testing or monitoring equipment from a communications system, which typically would require a very high resistance. Accordingly, the input impedance of the tip input 851 and ring input 852 may be made high enough to compensate for the size of the isolation resistance elements (830–833) to minimize signal losses. Other configurations and/or components, not shown, may be implemented to accomplish the function of the isolation circuit 804 within the scope of the present invention, for example an isolation transformer or a longitudinal sensing circuit using magnetic isolation instead of capacitive isolation.

Ground input 853 (FIG. 8) supplies a ground signal to the A/D from a ground circuit 806. The ground circuit 806 provides a ground reference for monitoring and testing of the DSL line 110 for imbalances on the tip 823 or ring 824 with respect to ground, for example, a line-to-ground fault. As shown in FIG. 8, the ground circuit 806 may comprise a connection to a ground reference point 841, such as the common ground of the AFE 802, an earth ground point 844, and a plurality of resistors (842, 843). Although not shown, other configurations and/or components may be implemented to accomplish the function of the ground circuit 806 within the scope of the present invention, such as an isolation transformer.

The AFE 802 can interpret T1 test samples received via a T1 line 116 as digitized values and generate test patterns based on these digitized values in response to test commands (not depicted), such as those contained in the control header 600, that are received by the processing circuitry 406. This may involve the processing circuitry sending control signals to various elements of the AFE 802 such the D/A 204, the A/D 206, the line driver 208, or the multiple input device 810. The processing circuitry 406 is responsive to the test commands, in addition to being responsive to common AFE commands (also not depicted). Further, in response to the test commands received by the processing circuitry 406, the AFE 802 can select from various test inputs (e.g., 850–853) that are connected to the multiple input device 810. Other test functions may also be performed by the AFE 802 in response to test commands received by the processing circuitry 406, for example, hybrid 218 balance, line driver 208 linearity, and AFE 802 dynamic range measurements.

Figure 9:
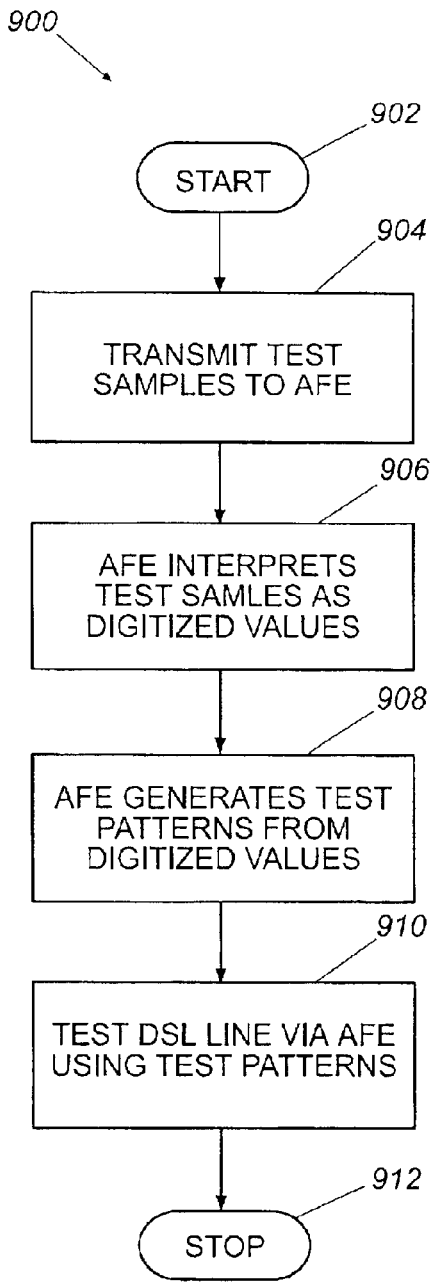
FIG. 9 is a flowchart diagram of a method for testing a DSL line that may be applied, for example, to the testing system of FIG. 4 to test a DSL line in accordance with one embodiment of the present invention.

FIG. 9 shows a flowchart diagram of a method 900 for testing a DSL line that may be applied, for example, to the testing system of FIG. 4 to test a DSL line in accordance with one embodiment of the present invention. In this regard, the method 900 for testing a DSL line will be described in reference to its possible application to the testing system of FIG. 4 to facilitate the description of the present invention. It should be understood that the method 900 for testing a DSL line may be applied to other testing systems besides that of FIG. 4, as will be apparent to one skilled in the art. It should be further understood that although the flowchart diagram of FIG. 9 presents the method 900 with steps in a specific order, one or more of these steps may be executed in a different order than that shown in FIG. 9, or described below, within the scope of the present invention, as will be apparent to one skilled in the art.

The method 900 for testing a DSL line begins with step 902 that is designated as "start". From the start step 902, the method 900 comprises step 904 in which T1 test samples 402 are transmitted to an AFE 202 via a communications line, such as T1 line 116. The test samples 402 may be transmitted, for example, from a testing device such as a computer or other device capable of transmitting test samples 402 to the AFE 202. Following step 904, the method 900 comprises step 906. In this step, the AFE 202 interprets the transmitted test samples 402 as multi-bit digitized values. The step 906 may be controlled, for example, by processing circuitry 406 that is responsive to internal settings or external test commands 408 received by the AFE 202.

From step 906, the method 900 comprises step 908 in which the AFE 202 generates test patterns 404 from the digitized values that are interpreted from the test samples 402 in step 906. The step 908 may be controlled, for example, by processing circuitry 406 that is responsive to internal settings or external test commands 408 received by the APE 202.

Following step 908, the method 900 comprises step 910 in which the DSL line 110 that is interfaced to the T1 line 116 is tested using the test patterns 404. Thus, in step 910, the DSL line 110 is tested via the AFE 202. The step 910 may be controlled, for example, by processing circuitry 406 that is responsive to internal settings or external test commands 408 received by the AFE 202. After step 910, the steps of the method 900 for testing a DSL line are complete and the method 900 proceeds to the final step 912 which is designated "stop".

Figure 10:
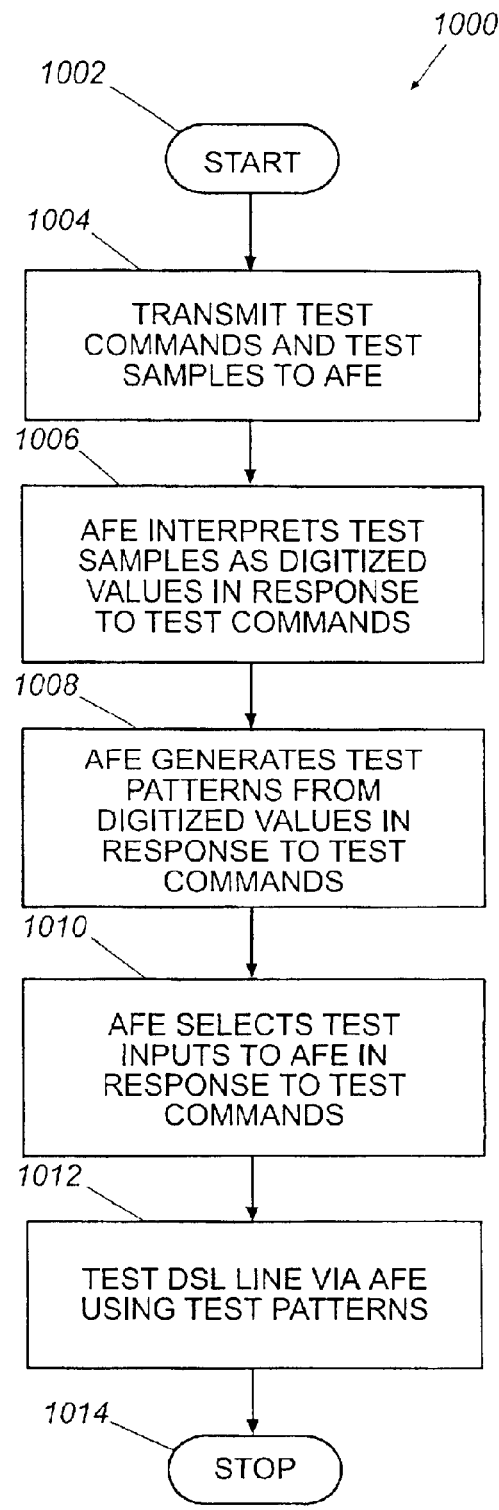
FIG. 10 is a flowchart diagram of a method for testing a DSL line that may be applied, for example, to the analog front end (AFE) system of FIG. 8 to test a DSL line in accordance with a preferred embodiment of the present invention.

FIG. 10 shows a flowchart diagram of a method 1000 for testing a DSL line that may be applied, for example, to the analog front end (AFE) system of FIG. 8 to test a DSL line in accordance with a preferred embodiment of the present invention. In this regard, the method 1000 for testing a DSL line will be described in reference to its possible application to the AFE system of FIG. 8 to facilitate the description of the present invention. It should be understood that the method 1000 for testing a DSL line may be applied to other systems besides that of FIG. 8, as will be apparent to one skilled in the art. It should be further understood that although the flowchart diagram of FIG. 10 presents the method 1000 with steps in a specific order, one or more of these steps may be executed in a different order than that shown in FIG. 10, or described below, within the scope of the present invention, as will be apparent to one skilled in the art.

The method 1000 for testing a DSL line begins with step 1002 that is designated as "start". From the start step 1002, the method 1000 comprises step 1004 in which test commands and T1 test samples are transmitted to an AFE system 802 via a communications line, such as T1 line 116. The test commands and test samples may be transmitted, for example, from a testing device such as a computer or other device capable of transmitting test commands and test samples to the AFE 802. Following step 1004, the method 1000 comprises step 1006. In this step, the AFE 802 interprets the transmitted test samples as multi-bit digitized values in response to the transmitted test commands. The step 1006 may be controlled by processing circuitry 406 that is responsive to the test commands received by the AFE 802.

From step 1006, the method 1000 comprises step 1008 in which the AFE 802 generates test patterns, in response to the test commands transmitted to the AFE 802 in step 1004, from the digitized values that are interpreted from the test samples in step 1006. The step 1008 may be controlled by processing circuitry 406 that is responsive to the test commands received by the AFE 802.

Following step 1008, the method 1000 comprises step 1010 in which the AFE 802 selects from test inputs (e.g., 850–853) to the AFE 802 in response to the test commands transmitted to the AFE 802. In this regard, the selection of one or more of the inputs to the AFE 802, as was described in more detail above in reference to FIG. 8, facilitates various testing, such as verification of the AFE 802, hybrid 218 balance, line driver 208 linearity, or other fault mechanisms that could be attributed to the testing circuit for the DSL line 110. The step 1008 may be controlled by processing circuitry 406 that is responsive to the test commands received by the AFE 802.

From step 1010, the method 1000 comprises step 1012 in which the DSL line 110 that is interfaced to the T1 line 116 is tested, in response to the test commands, using the test patterns generated by the AFE 802 in step 1008. Thus, in step 1012, the DSL line 110 is tested via the AFE 802. The step 1012 may be controlled by processing circuitry 406 that is responsive to the test commands received by the AFE 802. After step 1012, the steps of the method 1000 for testing a DSL line are complete and the method 1000 proceeds to the final step 1014 which is designated "stop".

It is reiterated that the preceding description of the present invention is made in the context of application to HDSL/T1 based communications systems in order to facilitate the description of the present invention. Further, it should be understood that the present invention can be applied to all communications systems in general that incorporate an xDSL interface and all such applications are included within the scope of the present invention.

The flowchart diagrams of the method 900, 1000 for testing a DSL line described above and shown in FIGS. 9 and 10 of the present invention show the architecture, functionality, and operation of possible implementations of the present invention. In this regard, each block may represent a module, segment, or portion of code, which comprises one or more executable instructions for implementing the specified logical function(s). It should also be noted that in some alternative implementations, the functions noted in the blocks may occur out of the order shown.

It is emphasized that the above-described embodiments of the present invention, particularly any "preferred" embodiments, are merely possible examples of the implementations that are merely set forth for a clear understanding of the principles of the present invention. It will be apparent to those skilled in the art that many modifications and variations may be made to the above-disclosed embodiments of the present invention without departing substantially from the spirit and principles of the invention. All such modifications and variations are intended to be included within the scope of the disclosure and present invention and protected by the following claims.

What is claimed is:

1. An analog front end system, comprising:
   a digital-to-analog converter;
   a line driver, electrically coupled to said digital-to-analog converter;
   a hybrid, electrically coupled to said line driver;
   a multiple-input device having a plurality of inputs and at least one output, wherein at least one of said inputs is electrically coupled to said hybrid;
   an analog-to-digital converter, electrically coupled to said output of said multiple-input device;
   an isolation circuit configured to maintain direct-current isolation between the terminals of said isolation circuit, wherein:
      said isolation circuit is electrically coupled to at least one of said inputs of said multiple-input device; and said isolation circuit comprises a plurality of resistance elements and a plurality of capacitance elements, electrically coupled;

a ground circuit configured to provide a ground reference, wherein:

said ground circuit is electrically coupled to at least one of said inputs of said multiple-input device; and said ground circuit comprises a plurality of resistance elements and at least one ground reference point, electrically coupled; and a processing circuitry, said processing circuitry being configured to control said digital-to-analog converter, said line driver, said analog-to-digital converter, and said multiple-input device in response to commands received by said processing circuitry.

2. The analog front end system of claim 1, wherein said multiple-input device is configured such that said inputs are selectively operational.

3. The analog front end system of claim 1, wherein said multiple-input device is a multiplexer.

4. An analog front end system, comprising:

a digital-to-analog converter;

a line driver, electrically coupled to said digital-to-analog converter;

means for multiplexing a plurality of inputs to at least one output, electrically coupled to said line driver;

an analog-to-digital converter, electrically coupled to said means for multiplexing; and means for direct current isolation of said multiple-input device from an input terminal, electrically coupled to one of said inputs of said means for multiplexing.

5. The analog front end system of claim 4, further comprising a hybrid, electrically coupled between said line driver and one of said inputs of said means for multiplexing.

6. The analog front end system of claim 4, further comprising means for providing a ground reference, electrically coupled to one of said inputs of said means for multiplexing.

7. The analog front end system of claim 4, further comprising means for controlling said digital-to-analog converter, said line driver, said analog-to-digital converter, and said multiple-input device responsive to commands received by said means for controlling.

8. An analog front end system, comprising:

a digital-to-analog converter;

a line driver, electrically coupled to said digital-to-analog converter;

a multiple-input device having a plurality of inputs and at least one output, electrically coupled to said line driver;

a isolation circuit electrically coupled to said multiple input device, wherein said isolation circuit comprises a plurality of resistance elements and a plurality of capacitance elements, electrically coupled; and an analog-to-digital converter, electrically coupled to said multiple-input device.

9. The analog front end system of claim 8, further comprising a hybrid, electrically coupled between said line driver and said multiple-input device.

10. The analog front end system of claim 8, further comprising a ground circuit configured to provide a ground reference, electrically coupled to said multiple-input device.

11. The analog front end system of claim 10, wherein said ground circuit comprises a plurality of resistance elements and at least one ground reference point, electrically coupled.

12. The analog front end of claim 8, wherein said multiple-input device is configured such that said inputs are selectively operational.

13. The analog front end system of claim 8, further comprising a processing circuitry, said processing circuitry being configured to control said digital-to-analog converter, said line driver, said analog-to-digital converter, and said multiple-input device in response to commands received by said processing circuitry.

* * * * *